United States Patent [19]

Moriya et al.

[11] Patent Number: 5,414,044

[45] Date of Patent: * May 9, 1995

[54] POLYOLEFIN RESIN COMPOSITION AND CROSSLINKED MOLDED ARTICLE AND PROCESS FOR THE PRODUCTION THEREOF

[75] Inventors: Satoru Moriya, Ohtake; Mamoru Takahashi, Yamaguchi; Akio Ishimoto, Iwakuni; Toshiyuki Hirose, Ohtake, all of Japan

[73] Assignee: Mitsui Petrochemical Industries, Ltd., Tokyo, Japan

[ * ] Notice: The portion of the term of this patent subsequent to Jan. 11, 2011 has been disclaimed.

[21] Appl. No.: 143,245

[22] Filed: Oct. 29, 1993

Related U.S. Application Data

[60] Continuation-in-part of Ser. No. 798,041, Nov. 27, 1991, abandoned, which is a division of Ser. No. 552,509, Jul. 16, 1990, abandoned.

[30] Foreign Application Priority Data

Jul. 19, 1989 [JP] Japan ................................. 1-186242
Mar. 30, 1990 [JP] Japan ................................. 2-85212

[51] Int. Cl.⁶ .......................................... C08L 51/06
[52] U.S. Cl. ........................................ 525/74; 525/75; 525/78; 525/80; 524/504
[58] Field of Search .................. 525/74, 75, 78, 80; 524/504

[56] References Cited

U.S. PATENT DOCUMENTS

| | | | |
|---|---|---|---|
| 4,614,778 | 9/1986 | Kajiura et al. | 526/281 |
| 4,792,583 | 12/1988 | Coran | 525/74 |
| 4,801,647 | 1/1989 | Wolfe, Jr. | 525/74 |
| 4,857,563 | 8/1989 | Croft et al. | 525/74 |
| 4,918,133 | 4/1990 | Moriya et al. | 525/97 |
| 4,992,511 | 2/1991 | Yamamoto et al. | . |
| 5,218,048 | 6/1993 | Abe et al. | . |
| 5,278,214 | 1/1994 | Moriya et al. | . |
| 5,304,596 | 4/1994 | Moriya et al. | . |

FOREIGN PATENT DOCUMENTS 2107538 5/1972 France .
1345747 2/1974 United Kingdom .

*Primary Examiner*—Vasu S. Jagannathan
*Attorney, Agent, or Firm*—Sherman and Shalloway

[57] ABSTRACT

A polyolefin resin composition comprising (A) a polyolefin resin, (B) a graft-modified α-olefin copolymer grafted with an unsaturated carboxylic acid and its derivative, and (C) an amino group-containing compound, (D) said polyolefin resin composition containing a crosslinked structure between the amino group-containing compound (C) and the graft-modified α-olefin copolymer (B), and containing, based on 100 parts by weight of the polyolefin resin (A) and the graft-modified α-olefin copolymer (B) in total, 1 to 99 parts by weight of each of the polyolefin resin (A) and the graft-modified α-olefin copolymer (B) and 0.01 to 10 parts by weight of the amino group-containing compound (C). The polyolefin resin composition gives a crosslinked molded article having impact resistance at ordinary temperature and a low temperature.

20 Claims, No Drawings

POLYOLEFIN RESIN COMPOSITION AND CROSSLINKED MOLDED ARTICLE AND PROCESS FOR THE PRODUCTION THEREOF

This application is a continuation-in-part of application Ser. No. 07/798,041, filed Nov. 27, 1991; which is a division of application Ser. No. 07/552,509, filed Jul. 16, 1990 all now abandoned.

DETAILED DESCRIPTION OF THE INVENTION

This invention relates to a polyolefin resin composition, and a crosslinked molded article and a process for the production thereof. More specifically, it relates to a polyolefin resin composition capable of giving a crosslinked molded article having impact resistance, in particular, at ordinary temperature and a low temperature and said crosslinked molded article and a process for the production thereof.

A thermoplastic rubbery elastomer has been conventionally used as a material for molded articles which are required to have impact resistance, such as parts for automobiles. This rubbery elastomer can be subjected to injection molding and extrusion due to its thermoplasticity and elasticity, and therefore, it can be molded into articles having excellent heat resistance, tensile properties, weatherability, flexibility and elasticity.

Since, however, there has been no proposal for molded articles formed from such a rubbery elastomer which are excellent, e.g. in rigidity and hardness and which also have well-balanced properties in impact resistance at ordinary temperature and low temperature, it is desired to develop materials which can impart molded articles with such properties.

On one hand, polyolefins which are widely used as general-purpose resins are excellent in chemical resistance and solvent resistance. However, many of polyolefins are poor in heat resistance, insufficient in crystallizability and poor in rigidity. In general, to improve polyolefins in rigidity and heat resistance, there is employed a procedure in which nucleating agents are incorporated into polyolefins to expedite the growth of crystal, or a procedure in which polyolefins are gradually cooled to accelerate the growth of crystal. However, it is hard to say that the alleged effects obtained by these procedures are sufficient. The procedure of incorporating into polyolefins a third component such as nucleating agents rather involves the risk of marring various excellent properties inherent in polyolefins, and the gradually cooling procedure is low in production efficiency and involves the risk of lowering impact strength as the non-crystalline part of polyolefins decreases.

A copolymer of ethylene and 2,3-dihydroxy-dicyclopentadiene has been disclosed as an example of copolymers of ethylene and bulky comonomers, e.g. in U.S. Pat. No. 2,883,372. However, this copolymer is poor in heat resistance as it has a glass transition temperature in the vicinity of 100° C., though said copolymer is well balanced between rigidity and transparency. Similar drawback is also observed in copolymers of ethylene and 5-ethylidene-2-norbornene.

Japanese Patent Publn. No. 14910/1971 proposes a homopolymer of 1,4,5,8-dimethano-1,2,3,4,4a,5,8,8a-octahydronaphthalene. The proposed polymer, however, is poor in heat resistance and heat ageing characteristics. Japanese L-O-P Publn. No. 127728/1983 further proposes a homopolymer of 1,4,5,8-dimethano-1,2,3,4,4a,5,8,8a-octahydronaphthalene or copolymers of said cycloolefin and norbornene type comonomers, which are apparently those obtained by ring opening polymerization (ring opening polymers) in light of the disclosure in said publication. These ring opening polymers which have unsaturated bonds in the polymer main chains, however, have such a drawback that they are poor in heat resistance and heat ageing characteristics.

In the course of these researches, we found that cycloolefin type random copolymers of ethylene and bulky cycloolefins are synthetic resins which are excellent in heat resistance we well as in heat ageing characteristics, chemical resistance, solvent resistance, dielectric characteristics and rigidity. On the basis of the above findings, we have already made various technical proposals as disclosed in Japanese L-O-P Publn. No. 168708/1985 and Japanese Patent Appln. Nos. 220550/1984, 236828/1984, 236829/1984, 242336/1984 and 95906/1986. In spite of their being olefin type polymers, the cycloolefin type random copolymers as proposed are excellent in heat resistance and rigidity. However, they involve such problems that they are brittle and poor in impact resistance.

It is an object of this invention to provide a novel polyolefin resin composition.

It is another object of this invention to provide a novel polyolefin resin composition capable of giving a molded article having improved impact resistance, in particular, impact resistance at ordinary temperature and low temperature, providing good coatability and adhesion to a coating.

It is further another object of this invention to provide a molded article having excellent properties described above.

It is still another object of this invention to provide a process for producing the present molded article above from the novel polyolefin resin composition of this invention.

Other and further objects and advantages of this invention will be apparent from the following description.

According to this invention, the above objects and advantages are achieved, first, by a polyolefin resin composition comprising:

(A) a polyolefin resin
(B) a graft-modified α-olefin copolymer grafted with an unsaturated carboxylic acid and/or its derivative, and
(C) an amino group-containing compound,
(D) said polyolefin resin composition containing a crosslinked structure between the amino group-containing compound (C) and the graft-modified α-olefin copolymer (B), and containing, based on 100 parts by weight of the polyolefin resin (A) and the graft-modified α-olefin copolymer (B) in total, 1 to 99 parts by weight of each of the polyolefin resin (A) and the graft-modified α-olefin copolymer (B) and 0.01 to 10 parts by weight of the amino group-containing compound (C).

The polyolefin resin composition of this invention comprises a polyolefin resin (A), a graft-modified α-olefin comprises (B) and an amino group-containing compound (C) as specified above.

As the polyolefin resin (A), preferred are, e.g. a homopolymer and copolymer of an α-olefin having 2 to 20 carbon atoms, or a random copolymer of ethylene, a cycloolefin and, optionally, other olefin.

Examples of the α-olefin having 2 to 20 carbon atoms are ethylene, propylene, 1-butene, 1-pentene, 1-hexene, 4-methyl-1-pentene, 1-octene and 1-decene.

The polyolefin resin (A) may be a homopolymer of any one of tile above α-olefins or a copolymer of a plurality of these αolefins.

As a homopolymer or copolymer for the polyolefin resin (A), advantageously usable are homopolymers or copolymers which have a crystallinity, determined by X-ray diffractometry, preferably of 10 to 95%, more preferably of 30 to 95%.

The above homopolymer or copolymer for the polyolefin resin (A) has an intrinsic viscosity $[\eta]$, determined in decalin at 135° C., preferably of 0.1 to 10 dl/g, more preferably of 1 to 5 dl/g.

The above homopolymer or copolymer for the polyolefin resin (A) has a melt flow rate, measured at 230° C. according to ASTM-D-1238, preferably of 0.01 to 100 g/10 min., more preferably of 0.1 to 50 g/10 min.

As the above polyolefin resin (A), a homopolymer or copolymer of propylene are particularly preferred. As a copolymer of propylene, copolymers of propylene with other α-olefins are preferred. Examples of the other α-olefins are ethylene, 1-butene, 1-pentene, 1-hexene, 4-methyl-1-pentene, 1-octene and 1-decene. These monomers may be used alone or in combination. Preferred as a propylene copolymer are copolymers which contain preferably at least 50 mol%, particularly preferably at least 80 mol% of recurring units derived from propylene.

As a propylene homopolymer or copolymer, those having a melt flow rate (MFR) of 0.5 to 45 g/10 min., are preferred.

The above homopolymer or copolymer for the polyolefin resin (A) can be prepared by homopolymerization or copolymerization of olefin(s) according to a known technique.

For example, polymer particles obtained by polymerization or copolymerization of the above α-olefins in a liquid phase, a gaseous phase or a combination of these two phases in the presence of a catalyst can be used as a crystalline polyolefin resin.

In a method using a liquid phase and gaseous phase in combination, it is preferable to preliminarily polymerize α-olefins in a specific catalyst by using, as a reaction solvent, an inert hydrocarbon or α-olefin which is raw material, and further polymerize the α-olefin in a gaseous phase.

As the above catalyst, usable are those which comprises a catalyst component (I) containing a transition metal belonging to the groups IV, V, VI, VII and VIII of the periodic table, e.g. titanium, zirconium, hafnium and vanadium, and a organometallic compound catalyst component (II) containing a metal belonging to the groups I, II and III of the periodic table, e.g. an organoaluminum compound having at least one Al-carbon bond in the molecule.

In addition, the above catalyst component (I) may be prepared by incorporating an electron donor (inside donor) in addition to the above-specified components. Such a catalyst component is described in Japanese L-O-P Publications Nos. 135102/1980, 135103/1980, 811/1981, 67311/1981 and 83006/1983.

As the organometallic compound catalyst component (II), usable are organoaluminum compounds which are prepared by a reaction between an organoaluminum compound and water, or between an aluminoxane solution and water or an active hydrogen-containing compound. Such an organometallic compound catalyst component (II) may be prepared by incorporating an electron donor (outside donor) in addition to the above organoaluminum compound.

In the presence of tile above catalyst, a small amount of an olefin is preliminarily polymerized in a liquid phase prior to main polymerization.

The main polymerization is carried out after the preliminary polymerization, whereby polymer particles are prepared. The temperature for the preliminary polymerization is preferably between $-40°$ C. and 80° C.

The temperature for the main polymerization using the above catalyst is preferably between $-50°$ C. and 200° C. The pressure therefor is between atmospheric pressure and 100 kg/cm$^2$.

The polymer particles are produced according to a method described in Japanese Patent Application No. 294,066/1988.

Further, as the polyolefin resin (A) used in this invention, preferred is a random copolymer of at least one cycloolefin selected from the group consisting of compounds of the following formula (1)

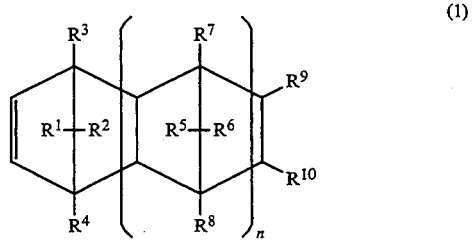

(1)

wherein each of $R^1$ to $R^{10}$ independently represents a hydrogen atom, a halogen atom or a hydrocarbon group, and n represents zero or a positive integer and compounds of the following formula

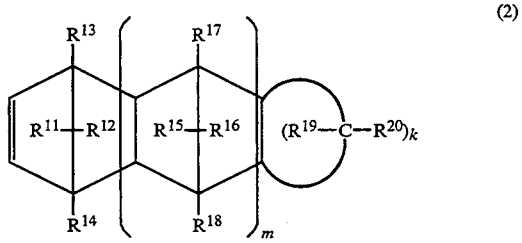

(2)

wherein each of $R^{11}$ to $R^{20}$ independently represents a hydrogen atom, a halogen atom or a hydrocarbon group, m represents zero or a positive integer, and k represents an integer of not less than 3, and ethylene.

Each of $R^1$ to $R^{10}$ in the formula (1) and $R^{11}$ to $R^{20}$ in the formula (2) is independently a hydrogen atom, a halogen atom or a monovalent hydrocarbon group.

As a halogen atom, fluorine, chlorine and bromine are preferred. Of these halogen atoms, chlorine is particularly preferred.

Preferred examples of the monovalent hydrocarbon group are an alkyl group having 1 to 10 carbon atoms such as methyl, ethyl, n-propyl, isopropyl, m-butyl, iso-butyl, sec-butyl, tert-butyl, amyl, hexyl, and neopentyl groups; phenyl, toluyl, benzyl and anisyl groups.

The cycloolefin of the formula (1) can be easily prepared by condensation of cyclopentadienes and corresponding olefins according to Diels-Alder reaction. And, the cycloolefin of the formula (2) can be easily prepared similarly by condensation of cyclopentadienes and corresponding cycloolefins according to Diels-Alder reaction.

Examples of the cycloolefin of the formula (1) are bicyclo[2,2,1]hept-2-ene derivatives such as bicyclo[2,2,1]hept-ene, 6-methylbicyclo[2,2,1]hept2-ene, 5,6-dimethylbicyclo[2,2,1]hept-2-ene, 1-methylbicyclo[2,2,1]hept-2-ene, 6-ethylbicyclo[2,2,1]hept-2-ene, 6-n-butylbicyclo[2,2,1]hept-2-ene, 6-isobutylbicyclo[2,2,1]hept-2-ene and 7-methylbicyclo[2,2,1]-hept-2-ene; octahydronaphthalenes such as 1,4,5,8-dimethano-1,2,3,4,4a,5,8,8a-octahydronaphthalene, 2-methyl-1,4,5,8-dimethano1,2,3,4,4a,5,8,8a-octahydronaphthalene, 2-ethyl1,4,5,8-dimethano-1,2,3,4,4a,5,8,8a-octahydronaphthalene, 2-propyl-1,4,5,8-dimethano1,2,3,4,4a,5,8,8a-octahydronaphthalene, 2-hexyl1,4,5,8-dimethano-1,2,3,4,4a,5,8,8a-octahydronaphthalene, 2,3-dimethyl -1,4,5,8-dimethano1,2,3,4,4a,5,8-,8a-octahydronaphthalene, 2-methyl-3-ethyl- 1,4,5,8-dimethano-1,2,3,4,4a,5,8,8a-octahydronaphthalene, 2-chloro-1,4,5,8-dimethano1,2,3,4,4a,5,8,8a-octahydronaphthalene, 2-bromo1,4,5,8-dimethano-1,2,3,4,4a,5,8,8a-octahydronaphthalene, 2-fluoro-1,4,5,8-dimethano1,2,3,4,4a,5,8,8a-octahydronaphthalene, 2,3-di-chloro-4,5,8-dimethano-1,2,3,4,4a,5,8,8a-octahydronaphthalene, 2-cyclohexyl-1,4,5,8-dimethano1,2,3,4,4a,5,8,8a-octahydronaphthalene, 2-n-butyl-1,4,5,8-dimethano-2,3,4,4a,5,8,8a-octahydronaphthalene and 2-isobutyl-4,5,8-dimethano-1,2,3,4,4a,5,8,8a-octahydronaphthalene; tetracyclo[4,4,0,1$^{2,5}$,1$^{7,10}$]-3-dodecene derivatives such as tetracyclo[4,4,0,1$^{2,5}$,1$^{7,10}$]-3-dodecene, 5,10-dimethyltetracyclo[4,4,0,1$^{2,5}$,1$^{7,10}$]-3-dodecene, 2,10-dimethyltetracyclo[4,4,0,1$^{2,5}$,1$^{7,10}$]-3-dodecene, 11,12-dimethytetracyclo[4,4,0,1$^{2,5}$,1$^{7,10}$]-3-dodecene, 2,7,9-trimethyltetracyclo[4,4,0,1$^{2,5}$,1$^{7,10}$]-3-dodecene, 9-ethyl-2,7-dimethyltetracyclo[4,4,0,1$^{2,5}$,1$^{7,10}$]-3-dodecene, 9-isobutyl-2,7dimethyltetracyclo[4,4,0,1$^{2,5}$,1$^{7,10}$]-3-dodecene, 9,11,12-trimethyltetracyclo[4,4,0,1$^{2,5}$,1$^{7,10}$]-3-dodecene, 9-ethyl-11,12-dimethyltetracyclo[4,4,0,1$^{2,5}$,1$^{7,10}$]-3-dodecene, 9-isobutyl-11,12-dimethyltetracyclo[4,4,0,1$^{2,5}$,1$^{7,10}$]-3-dodecene and 5,8,9,10-tetramethyltetracyclo[4,4,0,1$^{2,5}$,1$^{7,10}$]-3-dodecene; hexacyclo[6,6,1,1$^{3,6}$,1$^{10,13}$,0$^{2,7}$,0$^{9,14}$]-4-heptadecene derivatives such as hexacyclo[6,6,1,1$^{3,6}$,1$^{10,13}$,0$^{2,7}$,0$^{9,14}$]-4-heptadecene, 12-methylhexacyclo[6,6,1,1$^{3,6}$,1$^{3,6}$,1$^{10,13}$, 0$^{2,7}$,0$^{9,14}$]-4-heptadecene, 12-ethylhexacyclo[6,6,1,1$^{3,6}$,1$^{10,13}$,0$^{2,7}$,0$^{9,14}$]-4-heptadecene, 12isobutylhexacyclo[6,6,1,1$^{3,6}$,1$^{10,13}$,0$^{2,7}$,0$^{9,14}$]-4-heptadecene and 1,6,10-trimethyl-12-isobutylhexacyclo-[6,6,1,1$^{3,6}$,1$^{10,13}$,0$^{2,7}$,0$^{9,14}$]-4-heptadecene; and octacyclo- 8,8,0,1$^{2,9}$,1$^{4,7}$,1$^{11,18}$,1$^{13,16}$,0$^{3,8}$,0$^{12,17}$]-5dodecene derivatives such as octacyclo[8,8,0,1$^{2,9}$,1$^{4,7}$,1$^{11,18}$,1$^{13,16}$,0$^{3,8}$,0$^{12,17}$]-5dodecene, 15-methyloctacyclo[8,8,0,1$^{2,9}$,1$^{4,7}$,1$^{11,18}$,1$^{13,16}$,0$^{3,8}$,0$^{12,17}$]-5dodecene and 15-ethyloctacyclo[8,8,0,1$^{2,9}$,1$^{4,7}$,1$^{11,18}$,1$^{13,16}$,0$^{3,8}$,0$^{12,17}$]-5dodecene.

Examples of the cycloolefins of the formula (2) are 14,15-dimethylpentacyclo[6,5,1,1$^{3,6}$,0$^{2,7}$,0$^{9,13}$]-4-pentadecene, pentacyclo[6,6,1,1$^{3,6}$,0$^{2,7}$,0$^{9,13}$]4-hexadecene, heptacyclo-[8,7,0,1$^{2,9}$,1$^{4,7}$,1$^{11,17}$,0$^{3,8}$,0$^{12,16}$-5-eicosene and heptacyclo[8,8,0,1$^{2,9}$,1$^{4,7}$,1$^{11,18}$,0$^{3,8}$,0$^{12,17}$]-5-heneicosene; tricyclo-[4,3,0,1$^{2,5}$]-3-decene derivatives such as tricyclo[4,3,0,1$^{2,5}$]-3-decene, 2-methyl-tricyclo[4,3,0,1$^{2,5}$]-3-decene and 5-methyltricyclo[4,3,0,1$^{2,5}$]-3-decene; tricyclo[4,4,0,1$^{2,5}$]-3-undecene derivatives such as tricyclo[4,4,0,1$^{2,5}$]-3-undecene and 10-methyl-tricyclo-[4,4,0,1$^{2,5}$]-3-undecene; pentacyclo[6,6,1,1$^{3,6}$,0$^{2,7}$,0$^{9,14}$]-4-hexadecene derivatives such as 1,3-dimethyl-pentacyclo[6,6,1,1$^{3,6}$,0$^{2,7}$,0$^{9,14}$]-4-hexadecene, 1,6-dimethylpentacyclo[6,6,1,1$^{3,6}$,0$^{2,7}$,0$^{9,14}$]-4-hexadecene and 5,16-dimethyl-pentacyclo[6,6,1,1$^{3,6}$,0$^{2,7}$,0$^{9,14}$]-4-hexadecene; and pentacyclo[6,5,1,1$^{3,6}$,0$^{2,7}$,0$^{9,13}$]4-pentadecene derivatives such as pentacyclo [6,5,1,1$^{3,6}$,0$^{2,7}$,0$^{9,13}$]-4-pentadecene and 1,3-dimethyl-pentacyclo[6,5,1,1$^{3,6}$,0$^{2,7}$,0$^{9,13}$]-4-pentadecene.

The monomer that is copolymerized with the cycloolefin of either the above formula (1) or the above formula (2) to obtain the random copolymer is ethylene or ethylene and other olefin. Examples of such other olefin are α-olefins having 3 to 20 carbon atoms such as propylene, 1-butene, 4-methyl-1-pentene. 1-hexene, 1-octene, 1-decene, 1-tetradecene, 1-hexadecene, 1-octadecene and 1eicosene; cycloolefins such as cyclopentene, cyclohexene, 3-methylcyclohexene and cyclooctene and 3a,5,6,7a-tetrahydro-4,7methano-1H-indene; nonconjugated dienes such as 1,4-hexadiene, 4-methyl-1,4hexadiene, 5-methyl-1,4-hexadiene, 1,7-octadiene, cyclopentadiene, 5-ethylidene-2-norbornene and 5-vinyl-2-norbornene; and norbornens such as norbornene-2, 5-methylnorbornene-2, 5-ethylnorbornene-2,5-isopropylnorbornene-2, 5-iso-butylnorbornene-2,5,6-dimethylnorbornene-2,5-chloronorbornene-2, 2-fluoronorbornene-2 and 5,6-dichloronorbornene-2.

The above random copolymer as the polyolefin resin (A) preferably contains, based on the total of ethylene units and cycloolefin units, 52 to 90 mol% of the ethylene units and 48 to 10 mol% of the cycloolefine units, and more preferably, it contains 55 to 80 mol% of the ethylene units and 45 to 20 mol% of the cycloolefin units. As the random copolymer containing other α-olefin units, advantageously usable are those which contain the other olefin units in an amount preferably of 20 mol% at most, more preferably of 10 mol% at most, based on the total of the ethylene, cycloolefin and other α-olefin units.

In these random copolymers, the ethylene units and the cycloolefin units are arranged substantially linearly and at random.

In these random copolymers, it is believed that the cycloolefins of the above formulae (1) and (2) are included in the polymer chain in structural units of the following formulae (3) and (4), respectively.

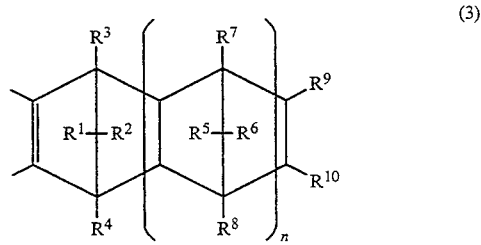

(3)

wherein $R^1$ to $R^{10}$ and n are as defined in the above formula ( 1 ).

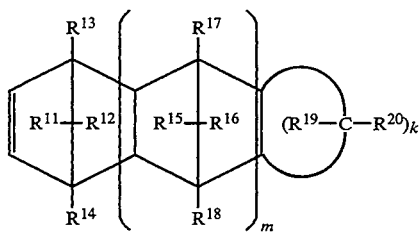

(4)

wherein $R^{11}$ to $R^{20}$, m and k are as defined In the formula (2).

In the above random copolymers as the polyolefin resin (A), those having a crystallinity, determined by X-ray diffractometry, preferably of 0 to 20%, more preferably 0 to 2% are advantageously usable.

The above random copolymers have an intrinsic viscosity $[\eta]$, measured in decalin at 135° C., preferably of 0.05 to 10 dl/g, more preferably of 0.2 to 1.2 dl/g.

Concerning other desirable properties of the above random copolymers, their softening temperature, measured by a thermal mechanical analyzer (TMA), is preferably in the range of 70° to 200° C., more preferably in the range of 100° to 180° C., and further, their glass transition point (Tg) is preferably in the range of 50° to 190° C., more preferably in the range of 80° to 170° C.

The polymerization for the production of the above random copolymers is usually carried out in a hydrocarbon solvent.

Examples of the above hydrocarbon solvent are aliphatic hydrocarbons such as hexane, heptane, octane and kerosine; alicyclic hydrocarbons such as cyclohexane and methylcyclohexane; and aromatic hydrocarbons such as benzene, toluene and xylene. When monomers for the production of the random copolymers are liquids under the copolymerization conditions, such monomers may be used as a reaction solvent. These solvents may be used alone or in combination.

As a catalyst for the polymerization, usable is a catalyst which is soluble in the hydrocarbon solvent used as a reaction solvent and comprises a vanadium compound and an organoaluminum compound.

The vanadium compound as a catalyst e.g. a compound of the formula $$VO(OR)_a X_b$$

wherein R represents a hydrocarbon group, X represents a halogen atom, and a and b are defined by $0 \leq a \leq 3$, $0 \leq b \leq 3$, and $2 \leq a+b \leq 3$, or a compound of the formula $$V(OR)_c X_d$$

wherein R and X are as defined in the above formula, and c and d are defined by $0 \leq c \leq 4$, $0 \leq d \leq 4$, and $3 \leq c+d \leq 4$.

Such vanadium compounds are also usable as an electron donor adduct.

Examples of the vanadium compounds are $VOCl_3$, $VO(OC_2H_5)Cl_2$, $VO(OC_2H_5)_2Cl$, $VO(O\text{-iso-}C_3H_7)Cl_2$, $VO(O\text{-n-}C_4H_9)Cl_2$, $VO(OC_2H_5)_3$, $VOBr_2$, $VCl_4$, $VOCl_2$, $VO(O\text{-n-}C_4H_9)_3$ and $VCl_3 \cdot 2(CO_8H_{17}OH)$.

These vanadium compounds may be used alone or in combination.

Further, examples of electron donors to form the adduct with the above vanadium compounds are oxygen-containing electron donors such as an alcohol, phenols, a ketone, an aldehyde, a carboxylic acid, an ester of an organic or inorganic acid, an ether, an acid amide, an anhydride and an alkoxysilane; and nitrogen-containing electron donors such as ammonia, an amine, a nitrile, isocyanate.

Specific examples of the electron donors are alcohols having 1 to 18 carbon atoms such as methanol, ethanol, propanol, pentanol, hexanol, octanol, dodecanol, octadecyl alcohol, oleyl alcohol, benzyl alcohol, phenylethyl alcohol, cumyl alcohol, isopropyl alcohol and isopropylbenzyl alcohol; phenols having 6 to 20 carbon atoms such as phenol, cresol, xylenol, ethylphenol, propylphenol, nonylphenol, cumylphenol and naphthol (these phenols may further have an lower alkyl group as a substituent.); ketones having 3 to 15 carbon atoms such as acetone, methyl ethyl ketone, methyl isobutylketone, acetophenone, benzophenone and benzoquinone; aldehydes having 2 to 15carbon atoms such as acetaldehyde, propionaldehyde, octylaldehyde, benzaldehyde, tolualdehyde and naphthaldehyde; organic acid esters having 2 to 30 carbons atoms such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisate, n-butyl maleate, diisobutyl methylmalonate, di-n-hexyl cyclohexenecarboxylate, diethyl ester of Nadic acid, diisopropyl tetrahydrophthalate, diethyl phthalate, diisobutyl phthalate, di-n-butyl phthalate, di-2-ethylhexylphthalate, $\gamma$-butyrolactone, $\gamma$-valerolactone, coumarin, phthalide and ethylene carbonate; acid halides having 2 to 15 carbon atoms such as acetyl chloride, benzoyl chloride, toluic acid chloride and anisic acid chloride; ethers having 2 to 20 carbon atoms such as methyl ether, ethyl ether, isopropyl ether, butyl ether, amyl ether, tetrahydrofuran, anisole and diphenyl ether; acid amides such as acetic amide, benzoic amide and toluic amide; amines such as methyamine, ethylamine, diethylamine, tributylamine, piperidine, tribenzylamine, aniline, pyridine and tetramethylenediamine; nitriles such as acetonitrile, benzonitrile and tolunitrile; and alkoxysilanes such as ethyl silicate and diphenylmethoxysilane. These electron donors may be used alone or in combination.

The organoaluminum compound as a component of the catalyst is a compound having at least one Al-carbon bond in the molecule.

Examples of the organoaluminum compound are organoaluminum compounds of the formula $$R^1_m Al(OR^2)_n H_p X_q \quad \text{(i)}$$

wherein $R^1$ and $R^2$ each independently represent a hydrocarbon group having preferably 1 to 15 carbon atoms, more preferably 1 to 4 carbon atoms, X represents halogen, and m, n, p and q are defined by $0 \leq m \leq 3$, $0 \leq n < 3$, $0 \leq p < 3$, $0 \leq q < 3$ and $m+n+p+q = 3$, and complex ion alkyl compounds of the formula, formed of a metal belonging to the group 1 of the periodic table and aluminum, $$M^1 Al R^1_4 \quad \text{(ii)}$$

wherein M¹ represents Li, Na or K, and R¹ has the same meaning as above.

The organoaluminum compounds of the above formula (i) include the following four subclasses.

Compounds of the formula $R^1{}_mAl(OR^2)_{3-m}$
wherein $R^1$ and $R^2$ have the same meanings as above, and m is defined preferably by $1.5 \leq m < 3$.

Compounds of the formula $R^1{}_mAlX_{3-m}$
wherein $R^1$ has the same meaning as above, X represents halogen, and m is defined preferably by $0 < m < 3$.

Compounds of the formula $R^1{}_mAlH_{3-m}$
wherein $R^1$ has the same meaning as above, and m is defined preferably by $2 \leq m < 3$.

Compounds of the formula $R^1{}_mAl(OR^2)_nX_q$
wherein $R^1$ and $R^2$ have the same meaning as above, X represents halogen, and m, n and q are defined by $0 \leq m \leq 3$, $0 \leq n < 3$, $0 \leq q < 3$ and $m+n+q=3$.

Specific examples of the organoaluminum compounds of the above formula (i) are trialkylaluminum such as triethylaluminum and tributylaluminum, triisopropylaluminum; dialkylaluminum alkoxides such as diethylaluminum ethoxide and dibutylaluminum butoxide; alkylaluminum sesquibutoxides such as ethylaluminum sesquibutoxide and butylaluminum sesquibutoxide; partially alkoxylated alkylaluminum having an average composition of the formula $R^1{}_{2.5}Al(OR^2)_{0.5}$; dialkylaluminum halides such as diethylaluminum chloride, dibutylaluminum chloride and diethylaluminum bromide; alkylaluminum sesquihalides such as ethylaluminum sesquichloride, butylaluminum sesquichloride and ethylaluminum sesquichloride; partially halogenated alkylaluminum such as ethylaluminum dichloride, propylaluminum dichloride, and butylaluminum dibromide; partially hydrogenated alkylaluminum such as dialkylaluminum hydrides, e.g. diethylaluminum hydride and dibutylaluminum hydride and alkylaluminum dihydrides, e.g. ethylaluminum dihydride and propylaluminum dihydrides; and partially alkoxylated and halogenated alkylaluminum such as ethylaluminum ethoxychloride, butylaluminum butoxychloride and ethylaluminum ethoxybromide.

Further, organoaluminum compounds which are similar to the compound of the formula (i) are usable, e.g. organoaluminum compounds in which at least two aluminum atoms are bonded to each other through an oxygen or nitrogen atom. Specific examples of such compounds are $(C_2H_5)_2AlOAl(C_2H_5)_2$, $(C_4H_9)_2AlOAl(C_4H_9)_2$, and

Examples of the organoaluminum compounds of the above formula (ii) are $LiAl(C_2H_5)_4$ and $LiAl(C_7H_{15})$. Of these compounds, alkylaluminum halides and alkylaluminum dihalides or mixtures of these are preferred.

The amount of the above vanadium compound as a vanadium atom is preferably 0.01 to 5 gram-atom/l, more preferably 0.05 to 3 gram-atom/l. And, as to the amount of the above organoaluminum compound, the ratio of aluminum atoms of the organoaluminum compound to vanadium atoms within a polymerization system (Al/V) is preferably not less than 2, more preferably 2 to 50, particularly preferably 3 to 20.

The graft-modified α-olefin copolymer (B) is produced by graft-modifying a copolymer of an α-olefin with an unsaturated carboxylic acid or its derivative.

As the above α-olefin, α-olefins having 2 to 20 carbon atoms are preferred. The scope of the copolymer of α-olefin (α-olefin copolymer) includes not only copolymers of a plurality of the above α-olefins but also copolymers of a plurality of the above α-olefins with a small proportion of diene compound(s).

Specific examples of the graft-modified α-olefin copolymer are:

(a) graft-modified ethylene-α-olefin copolymer rubbers, and (b) graft-modified propylene-α-olefin copolymer rubbers.

The above graft-modified ethylene-α-olefin copolymer rubbers (a) and graft-modified propylene-α-olefin copolymer rubbers (b) may be used alone or in combination.

Examples of the α-olefin as a component of the above graft-modified ethylene-α-olefin copolymer rubbers (a) are usually α-olefins having 3 to 20 carbon atoms such as propylene, 1-butene, 1-pentene, 1-hexene, 4-methyl-1-pentene, 1-octene, 1-decene and mixtures of these. Of these, propylene and/or 1-butene are preferred.

Examples of the α-olefin as a component of the above graft-modified propylene-α-olefin copolymer rubbers (b) are usually α-olefins having 4 to 20 carbon atoms such a 1-butene, 1-pentene, 1hexene, 4-methyl-1-pentene, 1-octene, 1-decene and mixtures of these. Of these, 1-butene is particularly preferred.

And, examples of the diene compound which may be included in the α-olefin copolymer of this invention as a component are linear nonconjugated dienes such as 1,4-hexadiene, 1,6-octadiene, 2-methyl-1,5-hexadiene, 6-methyl-1,5-heptadiene and 7-methyl-1,6-octadiene; cyclic nonconjugated dienes such as cyclohexadiene, dicyclopentadiene, methyltetrahydroindene, 5-vinyl-norbornene, 5-ethylidene-2-norbornene, 5-methylene-2norbornene, 5-isopropylidene-2-norbornene, and 6-chloromethyl-5-isopropenyl-2-norbornene; and diene compounds such as 2,3-diisopropylidene-5-norbornene, 2-ethylidene-3-1-isopropylidene-5-norbornene and 2-propenyl-2,2-norbornadiene.

The amount of these diene components is preferably not more than 10 mol%, more preferably not more than 5 mol%.

In the above graft-modified ethylene-α-olefin copolymer (a), the molar ratio between recurring units derived from ethylene and recurring units derived from the α-olefin (ethylene/ α-olefin) is usually 1/99 to 99/1, more preferably 50/50 to 95/5.

When the α-olefin is propylene, the above molar ratio is preferably 40/60 to 90/10, more preferably 50/50 to 90/10. And, when the α-olefin is an α-olefin having not less than 4 carbon atoms, the molar ratio is more preferably 80/20 to 95/5.

In the above graft-modified propylene-α-olefin copolymer (b), the molar ratio between recurring units derived from propylene and recurring units derived from the α-olefin (propylene/α-olefin) is preferably 50/50 to 95/5. When the α-olefin is 1-butene, the above molar ratio is particularly preferably 50/50 to 90/10. And, when the α-olefin is an α-olefin having not less than 5 carbon atoms, the molar ratio is particularly preferably 80/20 to 95/5.

Of the above graft-modified α-olefin copolymers, copolymers prepared by graft-modifying an ethylene-propylene random copolymer or ethylene-α-olefin random copolymer having an ethylene content of 35 to 50 mol% and a crystallinity of not more than 40% preferably not more than 10% with a grafting monomer are preferred, since such copolymers are excellent in view of improvement of mechanical properties such as impact strength.

As tile grafting monomer used in the above preparation of the graft-modified α-olefin copolymer (B), α,β-unsaturated carboxylic acid and its derivative preferred. Examples of the carboxylic acid are acrylic acid, maleic acid, fumaric acid, tetrahydrophthalic acid, itaconic acid, citraconic acid, crotonic acid, isocrotonic acid and, Nadic acid (endo-cis-bicyclo- [2,2,1]hept-5-ene). Further, examples of the above carboxylic acid derivative are unsaturated carboxylic acid anhydrides, unsaturated carboxylic acid halides, unsaturated carboxylic acid amides, unsaturated carboxylic acid imides and ester compounds of carboxylic acids. Specific examples of such derivatives are malenyl chloride, maleimide, maleic anhydride, citraconic anhydride, monomethyl maleate, dimethyl maleate and glycidyl maleate.

These grafting monomers may be used alone or in combination.

Of the above grafting monomers, unsaturated dicarboxylic acids or their anhydrides are preferred, and maleic acid and Nadic acid and anhydrides thereof are particularly preferred.

As the above graft-modified α-olefin copolymer (B), polymers which can exhibit rubbery elasticity are advantageous.

Such soft polymers have an elastic modulus (YM), measured by using a 2 mm thick test piece according to ASTM-D-638,preferably of 0.1 to 20,000 kg/cm$^2$, more preferably of 10 to 15,000 kg/cm$^2$.

Such soft polymers (B) have a glass transition point (Tg) preferably of -150° to 50° C., more preferably of -60° to -35° C. Further, these soft polymers (B) have an intrinsic viscosity [η], measured in decalin at 135° C., preferably of 0.2 to 10 dl/g, more preferably of 1to 5 dl/g. They also have a density preferably of 0.82 to 0.96 g/m$^3$, more preferably of 0.84 to 0.92 g/cm$^3$. Further, these soft polymers (B) have a crystallinity, measured by X-ray diffractometry, preferably of not more than 40% more preferably of not more than 25%, further preferably of not more than 10%. That is, these soft polymers (B) are preferably of low crystallizability or amorphous.

The graft-modified α-olefin copolymer (B) used in tills invention can be prepared, e.g. by modifying the above grafting monomer and α-olefin copolymer according to various known methods. For example, there is one method which comprises melting the above α-olefin copolymer and adding the grafting monomer to carry out graft polymerization. There is another method which comprises dissolving the α-olefin copolymer in a solvent and adding the grafting monomer to carry out graft polymerization. There is further another method which comprises incorporating the grafting monomer to an unreacted α-olefin copolymer so as to achieve an intended graft modification ratio and carrying out modification of the unreacted α-olefin copolymer. There is still further another method which comprises preliminarily preparing a graft-modified α-olefin copolymer having a high graft modification ratio and diluting it with a non-modified α-olefin copolymer to obtain a graft-modified α-olefin copolymer having an intended graft modification ratio. Graft-modified α-olefin copolymers prepared by any of these methods are usable in this invention. The graft-modified α-olefin copolymer (B) used in this invention has a graft modification ratio preferably of 0.01 to 5% by weight, more preferably of 0.1 to 4% by weight.

In order to graft the above grafting monomer effectively in such a graft reaction, it is preferable to carry out the reaction in the presence of a radical initiator. The graft reaction is usually carried out at a temperature between 60° C. and 350° C. The amount of the radical initiator is usually 0.001 to 5 parts by weight based on 100 parts by weight of a non-modified α-olefin copolymer.

As a radical initiator, organic peroxides and organic peresters are preferred. Specific examples of such radical initiators are benzoyl peroxide, dichlorobenzoyl peroxide, dicumyl peroxide, di-tert-butylperoxide, 2,5-dimethyl-2,5-di(peroxidibenzoate)hexyne-3, 1,4-bis(-tert-butylperoxide-isopropyl)benzene, lauroyl peroxide, tertbutyl peracetate, 2,5-dimethyl-2,5-di(tert-butylperoxy)hexyne, 2,5-dimethyl-2,5-di(tert-butylperoxy)hexane, tert-butyl perbenzoate, tertbutyl perphenylacetate, tert-butyl isobutyrate, tert-butylper-sec-octoate, cumyl perpivalate and tert-butyl perdiethylacetate. Further, azo compounds can be used as a radical initiator in this invention. Specific examples of the azo compounds are azobisisobutyronitrile and dimethylazoisobutyrate.

Of these radical initiators, the following are preferred: benzoyl peroxide, dicumyl peroxide, di-tert-butyl peroxide, 2,5-dimethyl-2,5-di(tert-butylperoxy)-hexyne-3, 2,5-dimethyl-2,5-di(tert-butylperoxy)hexane, and 1,4-bis(tert-butylperoxy-isopropyl)benzene.

As a graft-modified α-olefin copolymer in this invention, the above graft-modified ethylene-α-olefin copolymer (a) and graft-modified propylene-α-olefin copolymer (b) are used alone or in combination. And, other polymer or copolymer or other soft copolymer may be used in such an amount that the properties of the graft-modified α-olefin copolymer are not impaired.

Examples of the other polymer or copolymer above include aromatic vinyl hydrocarbon/conjugated diene copolymers and hydrogenation products thereof. Examples of the aromatic vinyl hydrocarbon/conjugated diene copolymers or their hydrogenation products are a styrene/butadiene copolymer rubber, styrene/butadiene/styrene copolymer rubber, styrene/isoprene block copolymer rubber, styrene/isoprene/styrene block copolymer rubber, hydrogenated styrene/butadiene/styrene block copolymer rubber and hydrogenated styrene/isoprene/styrene block copolymer rubber.

The amount of such other polymer or copolymer and other soft polymer based on the graft-modified α-olefin copolymer is 50% by weight at most, more preferably 20% by weight.

In this invention, the mixing ratio by weight between the above polyolefin resin (A) and the graft-modified α-olefin polymer (B) are 99:1 to 1:99. When these two components are mixed in the above mixing ratio, it is possible to obtain a resin composition having improved mechanical properties such as impact strength without impairing excellent properties of the polyolefin resin (A). Further, these two components are mixed in a mixing ratio, by weight, of 95:5 to 60:40, preferably 95:5 to 80:20, whereby the resulting polyolefin resin composition can be imparted with improved impact resistance with maintaining suitable rigidity.

When the graft-modified α-olefin copolymer (B) is incorporated into the polyolefin resin (A) as described above, the graft-modified α-olefin copolymer (B) is not homogeneously dissolved in the polyolefin resin (A), but at least part of the graft-modified α-olefin copolymer (B) is dispersed in the polyolefin resin (A).

The polyolefin resin composition of this invention further contains the amino group-containing compound (C).

In this invention, as the amino group-containing compound (C), advantageously usable are compounds which have at least two amino groups in the molecule.

Preferred examples of the amino group-containing compound (C) include aliphatic diamines, alicyclic diamines, aliphatic aromatic diamines, aromatic diamines and spiro ring-form diamines.

Examples of the amino group-containing compound (C) are aliphatic amines such as ethylenediamine, propylenediamine, hexamethylenediamine, diethylenetriamine, triethylenetetramine, tetraethylenepentamine, iminobispropylamine, bis(hexamethylene)triamine, 1,3,6-triaminomethylhexane, trimethylhexamethylenediamine, bispropylenediamine and diethylaminopropylamine; alicyclic amines such as menthenediamine, isophoronediamine, bis(4-amino-3-methylcyclohexyl)methane, N-aminoethylpiperazine and 1,3diaminocyclohexane; aliphatic aromatic amines such as m-xylylenediamine; aromatic amines such as o-, m- or p-phenylenediamine, diaminodiphenylmethane, diaminodiphenylsulfone, 2,4-diaminoanisole, 2,4-toluenediamine, 2,4-diaminodiphenyl-amine, 4,4-methylenedianiline and diaminodixylylsulfone; and bis-spiro-ring diamines such as 3,9-bis(3-aminopropyl)-2,4,8,10-tetraspiro[5,5]undecane.

These amino group-containing compounds (C) may be used alone or in combination.

Of these amino group-containing compounds (C), aliphatic amines are preferred, and above all, hexamethylenediamine is particularly preferred.

The amount of the amino group-containing compound (C) based on 100 parts by weight of the above polyolefin resin (A) and the soft polymer (B) in total is 0.01 to 10 parts by weight, preferably 0.2 to 2 parts by weight, more preferably 0.2 to 0.5 part by weight.

The polyolefin resin composition containing the above components (A), (B) and (C), provided by this invention, is heated, whereby a crosslinking reaction can be allowed to take place between the graft-modified α-olefin copolymer and the amino group-containing compound in the composition.

When a crosslinked structure is formed by Incorporating the amino group-containing compound (C), the diameters of dispersed particles of the graft-modified α-olefin copolymer (B) tend to become smaller. And, since the graft-modified α-olefin copolymer is finely dispersed as described here, articles molded from the polyolefin resin composition of this invention also have improved mechanical properties such as impact strength, etc.

The polyolefin resin composition of this invention can be prepared and molded into articles having a crosslinked structure by the following process. For example, one process comprises preparing a polyolefin resin (A) and a graft-modified α-olefin copolymer (B) separately, melt-kneading a mixture of the polyolefin resin (A) with the graft-modified α-olefin copolymer (B), incorporating an amino group-containing compound (C) into the mixture and kneading them under heat to form a crosslinked structure, or another process comprises dissolving a polyolefin resin (A) and a graft-modified. α-olefin copolymer (B) in a suitable solvent, e.g. a saturated hydrocarbon such as heptane, decane or cyclohexane or an aromatic hydrocarbon such as toluene, benzene or xylene, incorporating an amino group-containing compound (C) into the resultant solution, mixing them under heat to form a crosslinked structure, and then removing the solvent according to an ordinary method.

In particular, it is preferable in this invention to employ a process of forming a crosslinked structure by heating a mixture of the polyolefin resin (A), the graft-modified α-olefin copolymer (B) and the amino group-containing compound (C).

In the above case, the mixture may be prepared by premixing the polyolefin resin (A) and the graft-modified α-olefin copolymer (B) and then adding the amino group-containing compound (C). And, particularly preferable is a process which comprises premixing the polyolefin resin (A) and the graft-modified α-olefin copolymer (B) to prepare pellets having an island-sea structure where the graft-modified α-olefin copolymer (B) is dispersed in the polyolefin resin (A), mixing these pellets with the amino group-containing compound (C), and then heating the resultant mixture to form the crosslinked structure.

When the pellets are prepared in the above process, a method using a melt-kneading apparatus can be employed. For example, when using an extruder as the melt-kneading apparatus, it is possible to feed into the extruder the graft-modified α-olefin polymer (B) as a main feed and the polyolefin resin (A) as a side feed.

When the polyolefin resin (A) and the graft-modified α-olefin copolymer (B) are melt-kneaded, the heating temperature is set at a temperature which is the same as or higher than the higher melting point of those of the polyolefin resin (A) and the graft-modified α-olefin copolymer resin (B), preferably at a temperature higher than such a melting point by 0° to 80° C.

The amino group-containing compound (C) is then incorporated into the above-prepared pellets, whereby a mixture containing the pellets and the amino group-containing compound is prepared as the polyolefin composition of this invention.

Then, the mixture is heated in order to allow the amino group-containing compound to form the crosslinked structure, The crosslinked structure with the amino group-containing compound can be formed by heating the above mixture of the pellets and the amino group-containing compound and kneading the mixture while the pellets are in a molten state under heat. In this case, it is sufficient to heat the mixture at a temperature over the melting point of the pellets. The heating temperature is preferably set at 150° to 300° C., more preferably at 150° to 250° C. The crosslinked structure is usually formed by applying shear stress to a resin which is in a molten state due to heat. Specifically, it is preferable to employ a method of melt-kneading the above mixture of the pellets and the amino group-containing compound by using an apparatus capable of applying shear stress to a molten material such as a melt-kneading apparatus.

And, in this invention, the step of dispersing the graft-modified α-olefin copolymer (B) the polyolefin resin (A) as described above and the step of forming the crosslinked structure may be carried out stepwise.

The crosslinking reaction is carried out as above by using the amino group-containing compound, whereby, it is considered, an intermolecular crosslinked structure is formed in which at least part of graft groups grafted into the graft-modified α-olefin copolymer (B) are crosslinked with a moiety formed by dissociation of hydrogen atoms from the amino group-containing compound. And, the graft-modified α-olefin copolymer (B) in which the crosslinked structure has been formed exhibits excellent rubbery elasticity, and, as a result, articles molded from the polyolefin resin composition of this invention exhibits excellent impact resistance as a whole.

According to this invention, there is provided a composition which further contains an inorganic filler (D) in addition to the polyolefin resin composition containing the above components (A), (B) and (C) of this invention.

In this invention, fillers in various forms such as fibers, plates, particles or powders may be used as an inorganic filler (D).

Specific examples of the inorganic filler (D) are silica, diatomaceous earth, titanium oxide, magnesium oxide, pumice powders, pumice balloon, aluminum hydroxide, magnesium hydroxide, basic magnesium carbonate, dolomite, calcium sulfate, potassium titanate, barium sulfate, calcium sulfite, talc, clay, mica, asbestos, glass fibers, glass flakes, glass beads, calcium silicate, montmorillonite, bentonite, graphite, aluminum powders, molybdenum sulfate, boron fibers and silicon carbide fibers. These inorganic fillers may be used alone or in combination.

Of these inorganic fillers, for example, in order to improve heat resistance and rigidity of a molded article, fibrous inorganic fillers are particularly preferred. Specifically, glass fibers and boron fibers are particularly preferred.

The amount of the inorganic filler based on 100 parts by weight of the above polyolefin resin (A) and the graft-modified α-olefin copolymer (B) in total is 1 to 100 parts by weight, preferably 5 to 50 parts by weight.

Incorporation of the above inorganic filler makes it possible not only to improve the mechanical properties of molded articles having a crosslinked structure obtained from such a composition but also to decrease water absorption of the molded articles.

Such an inorganic filler may be incorporated when the pellets are prepared by mixing the polyolefin resin (A) and the graft-modified α-olefin copolymer (B) or when the amino group-containing compound is incorporated into the pellets to form the crosslinked structure by mixing them under heat. Further, after the crosslinked structure has been formed, the inorganic-filler may be added and incorporated, as required, by kneading.

The polyolefin resin composition of this invention may contain not only the above specified components but also additives such as an organic filler, heat stabilizer, weathering agent, anti-static agent, slip preventer, anti-blocking agent, anti-fogging additive, lubricant, pigment, dye, natural oil, synthetic oil, wax and the like.

The resin composition of this invention imparts molded articles with the crosslinked structure formed by the amino group-containing compound, and therefore, remarkably improves impact resistance, at ordinary temperature in particular, of the molded articles produced from the polyolefin resin and the graft-modified α-olefin copolymer without impairing excellent properties of the molded articles.

Therefore, the polyolefin resin composition of this invention can be not only used in usual fields of polyolefin but also desirably used in fields requiring mechanical strength such as fields where a filler-reinforced PP, ABS resin and modified polyphenylene oxide are used. Specifically, the polyolefin resin composition of this invention is applicable to engineering plastics, parts for automobiles, civil construction, and the like.

The polyolefin resin composition of this invention gives a crosslinked structure due to the amino group-containing compound, and therefore provides molded articles having excellent impact resistance particularly, at ordinary temperature. Furthermore, the molded articles exhibit little decrease in the other properties in spite of such excellent properties.

This invention will be explained hereinbelow by reference to Examples, which, however, shall not be construed to limit this invention.

In this invention, the following are methods of measuring properties of polyolefin resins, soft polymers (sometimes called a graft-modified elastic copolymer) and polyolefin resin compositions.

Intrinsic viscosity [η]:
Measurement was made in decalin at 135° C.

Softening temperature (TMA):
TMA is a temperature at which a penetrator having a 1-mm diameter flat top penetrated a sample 100 micrometers deep at a temperature elevation rate of 5° C./minute under a load of 50 g.

Amount of grafting monomer in graft-modified elastic copolymer:
Measurement was made by using $^{13}$C-NMR.

Crystallinity:
Measurement was made by using X-ray diffractometery at 23° C.

Rockwell hardness <R scale>(HR):
Measurement was made according to ASTM D 785 at 23° C. by using two square sheets having a thickness of 1 mm.

Tensile modulus (YM):
Measurement was made according to ASTM-D-638 at 23° C. by using a pressed test piece having a thickness of 2 mm.

IZ impact strength test:
Measurement was made according to ASTM D 256 at 23° C. by using an injection-molded notched test piece having a thickness of ⅛ inch.

Initial flexural modulus (FM):
Measurement was made according to ASTM D 790 at 23° C. by using an injection-molded test piece having a thickness of ⅛ inch at a crosshead speed of 20 mm/minute.

Flexural stress at yield point (FS):
Measurement was made according to ASTM D 790 in the same way as in FM.

Melt flow rate (MFR):
Measurement was made according to ASTM D-785 at 230° C.

Gloss:
Measurement was made according to ASTM D 523 at 23° C. by using an injection-molded square sheet at an incident angle of 60° C.

Resin density:
Measurement was made according to ASTM D1505-67 at 23° C.

Coatability:

A coating composition was prepared from 8 parts by weight of a melamine coating composition (FLEXENE #105, supplied by Nippon Bee Chemical Co., Ltd.) and 2 parts by weight of a thinner for the FLEXENE. An injection molded plate (12 mm×13 mm×2 mm) of the test composition was spray-coated with the coating composition with an air spray gun to form a coating having a thickness of about 40 μm. Another injection molded plate (12 mm×13 mm×2 mm) was spray-coated in the same manner as above to form a coating having a thickness of about 100 μm. The resultant coatings were dried by baking them at 80° C. for 30 minutes, and then allowed to stand at room temperature for 72 hours. Coatability (i.e. deformation and surface roughening) is evaluated on the basis of the following three ratings.

∘:Excellent
Δ:Good
×:Poor

Coating Adhesion:

(1) Cross-cut adhesion test:

Eleven cuts at intervals of 1 mm were given to the coating surface of the aforementioned plate having a coating thickness of 40 μm with a one-edge razor, widthwise and lengthwise at right angles, to form 100 squares. Then a Cellophane adhesive tape (JIS Z 1522) was attached to the coating fully under pressure, and peeling off quickly at an angle of 30 degrees to the coating. Results are reported as the number of squares which have not peeled off.

(2) Peel strength test:

Straight cuts at an interval of 1 cm were given to the coating surface of the aforementioned plate having a coating thickness of 100 μm with a one-edge razor. While the so-formed strip portion of the coating was strained in the direction of 180 degrees with a tensile tester at a rate of 50 mm/min, the load was read when the coating peeling off.

Example 1

85 Parts by weight of a propylene homopolymer (MFR=not more than 3.8, "PP-a" hereinafter) and 15 parts by weight of an a maleic anhydride grafted ethylene/propylene random copolymer having an anhydrous maleic acid graft amount of 1% by weight (ethylene component units content=80 mol%, crystallinity=4.5%, $[\eta]=2.2$ dl/g, YM=80 kg/cm$^2$, "M-EPR" hereinafter) were dry-blended and kneaded with a twin-screw extruder having an L/D of 42 and a diameter of 30 mm (set at a temperature of 170° C.). Then, 0.2 part by weight, per 100 parts by weight of the PP-a/M-EPR blend, of hexamethylenediamine (HMDA) was added, and the mixture was re-kneaded with the twin-screw extruder to give a polyolefin resin composition.

This composition was injection-molded at a cylinder temperature of 200° C. and a mold temperature of 40° C. to give test pieces and square sheets.

Table 1 shows physical properties of these molded articles.

Table 1 clearly shows that the molded articles of the above composition are excellent in impact strength, rigidity and hardness at room and low temperatures.

Comparative Example 1

Example 1 was repeated except that the hexamethylenediamine (HMDA) was not used. That is, a blend of 85 parts by weight of PP-a and 15 parts by weight of M-EPR was kneaded twice under the same conditions as in Example 1 to prepare a polyolefin resin composition. And, test pieces and square sheets were prepared from this composition.

Table 1 shows physical properties of these molded articles.

Table 1 clearly shows that the molded articles of the above composition are excellent in rigidity and hardness, but that they have low impact strength at room and low temperatures.

Example 2

Example 1 was repeated except that the amount of PP-a was changed to 80 parts by weight and that the amount of M-EPR was changed to 20 parts by weight, whereby a polyolefin resin composition was prepared, and test pieces and square sheets were obtained.

Table 1 shows physical properties of these molded articles.

Table 1 clearly shows that the molded articles of the above composition are excellent in impact strength, rigidity and hardness at room and low temperatures.

Comparative Example 2

Example 2 was repeated except that the hexamethylenediamine (HMDA) was not used. That is, a blend of 80 parts by weight of PP-a and 20 parts by weight of M-EPR was kneaded twice under the same conditions as in Example 2 to prepare a polyolefin resin composition. And, test pieces and square sheets were prepared from this composition.

Table 1 shows physical properties of these molded articles.

Table 1 clearly shows that the molded articles of the above composition are excellent in rigidity and hardness, but that they have low impact strength at room and low temperatures.

Example 3

Example 2 was repeated except that a polypropylene homopolymer having a MFR of 9.2 ("PP-b" hereinafter) was used in place of the PP-a, whereby a polyolefin resin composition was prepared, and test pieces and square sheets were obtained therefrom.

Table 1 shows physical properties of these molded articles.

Table 1 clearly shows that the molded articles of the above composition are excellent in impact strength, rigidity and hardness at room and low temperatures.

Comparative Example 3

Example 3 was repeated except that the hexamethylenediamine (HMDA) was not used. That is, a blend of 80 parts by weight of PP-b and 20 parts by weight of M-EPR was kneaded twice under the same conditions as in Example 3 to prepare a polyolefin resin composition. And, test pieces and square sheets were prepared from this composition.

Table 1 shows physical properties of these molded articles.

Table 1 clearly shows that the molded articles of the above composition are excellent in rigidity and hardness, but that they have low impact strength at room and low temperatures.

TABLE 1

| | HR (R scale) | FM (kg/cm²) | FS (kg/cm²) | IZ (23° C.) (kg/cm.cm) | IZ (−30° C.) (kg/cm.cm) |
|---|---|---|---|---|---|
| Example 1 | 79 | 13,800 | 430 | 58 | 5.3 |
| CEx. 1 | 82 | 14,200 | 450 | 5.3 | 3.1 |
| Example 2 | 79 | 12,400 | 380 | 76 | 7.8 |
| CEx. 2 | 75 | 13,300 | 410 | 7.8 | 3.2 |
| Example 3 | 76 | 12,700 | 390 | 69 | 7.2 |
| CEx. 3 | 79 | 12,900 | 400 | 8.4 | 3.3 |

CEx. = Comparative Example

Examples 4–8

(a) Synthesis of cyclic olefin copolymer (A):

A copolymerization reaction of ethylene and 1,4,5,8-dimethano-1,2,3,4,4a,5,8,8a-octahydronaphthalene (structural formula:

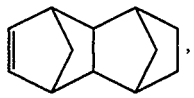

"DMON" hereinafter) was continuously carried out by using a 2-liter glass polymerizer having an agitating element. That is, the polymerizer was continuously charged, from the polymerizer top, with a cyclohexane solution of DMON such that the DMON concentration within the polymerizer was 60 g/l and with VO-(OC$_2$H$_5$)Cl$_2$ as a catalyst such that the vanadium concentration within the polymerizer was 7.2 mmol/l. On the other hand, a polymerization liquid was continuously extracted from the polymerizer bottom such that the polymerization liquid within the polymerizer was constantly 1 liter. And, from the polymerizer top, ethylene was charged at a rate of 85 liters/hour, hydrogen at a rate of 6 liters/hour, and nitrogen at a rate of 45 liters/hour. The polymerization reaction was carried out at 10° C. by circulating a refrigeration medium through a jacket externally provided to the polymerizer.

Under the above reaction conditions, a polymerization reaction product containing an ethylene DMON random copolymer was obtained. A small amount of isopropyl alcohol was added to the polymerization liquid extracted from the polymerizer bottom to stop the polymerization reaction. Then, the polymerization liquid was charged to a home-use mixer under rotating operation, which had been charged with acetone whose amount was about three times as large as that of the polymerization liquid, whereby a produced copolymer was precipitated. The precipitated copolymer was gathered by filtering, dispersed in acetone such that the resulting polymer concentration was about 50 g/l, and treated at the boiling point of acetone for about 2 hours. After the above procedure, the copolymer was gathered, and then, dried under reduced pressure at 120° C. overnight.

The ethylene-DMON random copolymer (A) obtained as above had an ethylene content, measured by $_{13}$C-NMR analysis, of 67 mol%, an intrinsic viscosity, measured at decalin at 135° C., of 0.60 dl/g and a softening temperature (TMA) of 111° C.

(b) The ethylene-DMON random copolymer (A) obtained in the above (a) and a graft-modified elastic copolymer (B) shown in Table 2 were dry-blended in a weight ratio shown in Table 2, and the resultant blend was kneaded with a twin screw extruder (set at a temperature of 210° C.). Then, hexamethylenediamine was added in a weight ratio shown in Table 2, the ratio being based on 100 parts by weight of the (A)/(B) blend. And, the resultant blend was again kneaded and extruded with the twin screw extruder (set at a temperature of 210° C.) to give a polyolefin resin composition.

This composition was injection-molded at a cylinder temperature of 230° C. and a mold temperature of 60° C. to prepare test pieces and square sheets.

Table 2 shows physical properties of these molded articles.

The polyolefin resin compositions obtained as above gave molded articles having excellent impact strength, rigidity and gloss. The molded articles also exhibited good coatability and coating adhesion.

Comparative Example 4

The same ethylene-DMON random copolymer (A) as that obtained in the section (a) of Example 4 and a graft-nonmodified elastic copolymer (B) was dry-blended in a weight ratio of 95/15, and the blend was kneaded with a twin-screw extruder (set at a temperature of 210° C.). Then, 0.2 part by weight, per 100 parts by weight of the (A)/(B) blend, of HMDA was added, and the resultant blend was again kneaded and extruded with a twin screw extruder (set at a temperature of 210° C.) to give a polyolefin resin composition.

This composition was molded in the same way as in Examples 4 to 8, and physical properties of the resultant molded articles were evaluated. Table 2 shows the physical properties.

The molded articles obtained as above had excellent rigidity and gloss, however, had low impact strength.

Comparative Example 5

The same ethylene-DMON random copolymer (A) as that obtained in the section (a) of Example 4 and a graft-modified elastic copolymer (B) was dry-blended in a weight ratio of 85/15, and the blend was kneaded with a twin-screw extruder (set at a temperature of 210° C.) twice to give a polyolefin resin composition.

This composition was molded in the same way as in Examples 4 to 8, and physical properties of the resultant molded articles were evaluated. Table 2 shows the physical properties.

The molded articles obtained as above had excellent rigidity and gloss, however, had low impact strength.

TABLE 2

| | Cyclic olefin random copolymer (A) | | | | | | Graft-modified elastic copolymer (B) | | | | | |
|---|---|---|---|---|---|---|---|---|---|---|---|---|
| | Composition (mole %) | | | | | | | | | | | Graft amount of maleic |
| | Cyclic olefin | 3rd monomer | ethylene | 3rd monomer | [η] dl/g | TMA (°C.) | Composition (mole %) | [η] dl/g | Crystallinity (%) | Density (g/cm) | Tensile modulus (g/cm²) | anhydride (wt. %) |
| Ex. 4 | — | | 67 | — | 0.60 | 111 | C$_2$=/C$_3$= = 80/20 | 2.2 | 4.5 | 0.88 | 80 | 0.50 |

TABLE 2-continued

| | | | | | | | | | | | | |
|---|---|---|---|---|---|---|---|---|---|---|---|---|
| Ex. 5 | " | — | " | — | " | " | " | " | " | " | " | " |
| Ex. 6 | " | — | " | — | " | " | " | " | " | " | " | " |
| Ex. 7 | " | — | " | — | " | " | " | " | " | " | " | " |
| Ex. 8 | " | — | " | — | " | " | " | " | " | " | " | " |
| CEx. 4 | " | — | " | — | " | " | " | " | " | " | 72 | — |
| CEx. 5 | " | — | " | — | " | " | " | " | " | " | 80 | " |

| | Blend ratio (A)/(B) (wt. %) | Amino group-containing compound (C) | | Polyolefin resin composition | | | | |
|---|---|---|---|---|---|---|---|---|
| | | Species | Weight ratio based on 100 parts by weight of (A)/(B) | IZ (kg.cm/cm) | FM (kg/cm$^2$) | FS (kg/cm$^2$) | Gloss (%) | TMA (%) |
| Ex. 4 | 90/10 | hexamethylene diamine | 0.20 | 32.6 | 21400 | 800 | 185 | 112 |
| Ex. 5 | 85/15 | hexamethylene diamine | 0.05 | 52.7 | 18600 | 680 | 89 | 111 |
| Ex. 6 | " | hexamethylene diamine | 0.10 | 56.4 | 18900 | 680 | 85 | 111 |
| Ex. 7 | " | hexamethylene diamine | 0.20 | 56.0 | 18700 | 690 | 78 | 111 |
| Ex. 8 | 80/20 | hexamethylene diamine | 0.20 | 66.4 | 16100 | 580 | 70 | 111 |
| CEx. 4 | 85/15 | hexamethylene diamine | 0.20 | 6.8 | 19800 | 740 | 93 | 111 |
| CEx. 5 | " | — | — | 5.4 | 20200 | 760 | 92 | 110 |

Ex. = Example;
CEx. = Comparative Example

Examples 9–11

A cyclic olefin random copolymer (A) obtained in the same way as in the section (a) of Example 4 and shown in Table 3 and a graft-modified elastic copolymer (B) shown in Table 3 were dry-blended in a weight ratio shown in Table 3, and the blend was kneaded with a twin-screw extruder (set at a temperature of 210° C.). Then, 0.2 part by weight, per 100 parts by weight of the (A)/(B) blend, of HMDA was added, and the resultant blend was kneaded and extruded with a twin screw extruder (set at a temperature of 210° C.) to give a polyolefin resin composition.

This composition was molded in the same way as in Examples 4 to 8, and physical properties of the resultant molded articles were evaluated. Table 3 shows the physical properties.

The molded articles obtained as above were excellent in impact strength, rigidity and gloss. The molded articles also exhibited good coatability and coating adhesion.

Examples 12–13

A cyclic olefin random copolymer (A) and a graft-modified elastic copolymer (B) both shown in Table 3 were dry-blended in a weight ratio of 85/15. and the resultant blend was kneaded with a twin screw extruder (set at a temperature of 210° C.). Then, 4,4'-diaminotriphenylmethane was added in a weight ratio shown in Table 3, the ratio being based on 100 parts by weight of the (A)/(B) blend. And, the resultant blend was again kneaded and extruded with the twin screw extruder (set at a temperature of 210° C.) to give a polyolefin resin composition.

This composition was molded in the same way as in Examples 4 to 8, and physical properties of the resultant molded articles were evaluated. Table 3 shows the physical properties.

The molded articles obtained as above were excellent in impact strength, rigidity and gloss. The molded articles also exhibited good coatability and coating adhesion.

Comparative Example 6

A cyclic olefin random copolymer (A) and a graft-nonmodified elastic copolymer (B) both shown in Table 3 were dry-blended in a weight ratio of 85/15, and the resultant blend was kneaded with a twin screw extruder (set at a temperature of 210° C.). Then, 0.2 part by weight, per 100 parts by weight of the (A)/(B) blend, of HMDA was added. And, the resultant blend was again kneaded and extruded with a twin screw extruder (set at a temperature of 210° C.) to give a polyolefin resin composition.

This composition was molded in the same way as in Examples 4 to 8, and physical properties of the resultant molded articles were evaluated. Table 3 shows the physical properties.

The molded articles obtained as above had excellent rigidity and gloss, however, had low impact strength.

Comparative Example 7

A cyclic olefin random copolymer (A) and a graft-nonmodified elastic copolymer (B) both shown in Table 3 were dry-blended in a weight ratio of 85/15, and the resultant blend was kneaded twice with a twin screw extruder (set at a temperature of 0° C.) to give a polyolefin resin composition.

This composition was molded in the same way as in Examples 4 to 8, and physical properties of the resultant molded articles were evaluated. Table 3 shows the physical properties.

The molded articles obtained as above had excellent rigidity and gloss, however, had low impact strength.

TABLE 3

| Cyclic olefin random copolymer (A) | Graft-modified elastic copolymer (B) | |
|---|---|---|
| Composition | | Graft amount |

TABLE 3-continued

| | Cyclic olefin | 3rd monomer | (mole %) ethylene | 3rd monomer | [η] dl/g | TMA (°C.) | Composition (mole %) | [η] dl/g | Crystallinity (%) | Density (g/cm) | Tensile modulus (g/cm²) | of maleic anhydride (wt. %) |
|---|---|---|---|---|---|---|---|---|---|---|---|---|
| Ex. 9 | | propylene | 66 | 5 | 0.57 | 115 | $C_2^=/C_3^=/$ 5-ethylidene-2-norborne = 66/31/3 | 2.1 | 0 | 0.87 | 19 | 0.47 |
| Ex. 10 | " | — | " | " | " | " | $C_2^=/C_3^=/$ 5-ethylidene-2-norborne = 66/31/3 | " | " | " | " | " |
| Ex. 11 | " | — | " | " | " | " | $C_2^=/C_3^=/$ 5-ethylidene-2-norborne = 66/31/3 | " | " | " | " | " |
| Ex. 12 | " | — | " | " | " | " | $C_2^=/C_3^=/$ 5-ethylidene-2-norborne = 66/31/3 | " | " | " | " | " |
| CEx. 13 | " | — | " | " | " | " | $C_2^=/C_3^=/$ 5-ethylidene-2-norborne = 66/31/3 | " | " | " | " | " |
| CEx. 6 | " | — | " | " | " | " | $C_2^=/C_3^=/$ 5-ethylidene-2-norborne = 66/31/3 | " | " | " | 17 | — |
| CEx. 7 | " | — | " | " | " | " | $C_2^=/C_3^=/$ | " | " | " | " | — |

| | Blend ratio (A)/(B) (wt. %) | Amino group-containing compound (C) Species | Weight ratio based on 100 parts by weight of (A)/(B) | Polyolefin resin composition | | | | |
|---|---|---|---|---|---|---|---|---|
| | | | | IZ (kg.cm/cm) | FM (kg/cm²) | FS (kg/cm²) | Gloss (%) | TMA (%) |
| Ex. 9 | 90/10 | hexamethylene diamine | 0.20 | 20.3 | 21600 | 790 | 87 | 114 |
| Ex. 10 | 85/15 | hexamethylene diamine | 0.20 | 45.9 | 18900 | 690 | 85 | 113 |
| Ex. 11 | 80/20 | hexamethylene diamine | 0.20 | 60.2 | 17000 | 610 | 83 | 113 |
| Ex. 12 | 85/15 | 4,4'-diaminotriphenyl methane | 0.10 | 36.1 | 18500 | 690 | 85 | 113 |
| Ex. 13 | " | 4,4'-diaminotriphenyl methane | 0.20 | 38.2 | 18600 | 700 | 84 | 114 |
| CEx. 6 | " | hexamethylene diamine | 0.20 | 6.8 | 19600 | 730 | 95 | 114 |
| CEx. 7 | " | — | — | 7.2 | 19088 | 740 | 96 | 113 |

Ex. = Example;
CEx. = Comparative Example

Examples 14–17

A cyclic olefin random copolymer (A) and a graft-modified elastic copolymer (B) both shown in Table 4 were dry-blended: In a weight ratio of 85/15, and the resultant blend was kneaded with a twin-screw extruder (set at a temperature of 210° C.). Then, HMDA was added in a weight ratio shown in Table 4, the ratio being based on 100 parts by weight of the (A)/(B) blend. And, the resultant blend was again kneaded and extruded with the twin screw extruder to give a polyolefin resin composition.

This composition was molded in the same way as in Examples 4 to 8, and physical properties of the resultant molded articles were evaluated. Table 4 shows the physical properties.

The molded articles obtained as above were excellent in impact strength, rigidity, gloss and heat resistance. The molded articles also exhibited good coatability and coating adhesion.

Comparative Examples 8–9

A cyclic olefin random copolymer (A) and a graft-modified elastic copolymer (B) both shown in Table 4 were dry-blended in a weight ratio of 85/15, and the resultant blend was kneaded twice with a twin screw extruder to give a polyolefin resin composition.

This composition was molded in the same way as in Examples 4 to 8, and physical properties of the resultant molded articles were evaluated. Table 4 shows the physical properties.

The molded articles obtained as above had excellent rigidity, gloss and heat resistance, however, had low impact strength.

TABLE 4

| | Cyclic olefin random copolymer (A) | | | | | | Graft-modified elastic copolymer (B) | | | | |
|---|---|---|---|---|---|---|---|---|---|---|---|
| | | | Composition (mole %) | | | | | | Crystallinity (%) | Density (g/cm) | Tensile modulus (g/cm²) | Graft amount of maleic anhydride (wt. %) |
| | Cyclic olefin | 3rd monomer | ethylene | 3rd monomer | [η] dl/g | TMA (°C.) | Composition (mole %) | [η] dl/g | | | | |
| Ex. 14 | | — | 62 | — | 0.61 | 154 | $C_2^=/C_3^=$ = 80/20 | 2.2 | 4.5 | 0.88 | 80 | 0.50 |
| Ex. 15 | " | — | " | — | " | " | " | " | " | " | " | " |
| Ex. 16 | " | — | " | — | " | " | $C_2^=/C_3^=/$ 5-ethylidene-2-norborne = 66/31/3 | 2.1 | 0 | 0.87 | 19 | 0.47 |

TABLE 4-continued

| | | | | | | | | | | | |
|---|---|---|---|---|---|---|---|---|---|---|---|
| Ex. 17 | " | — | " | — | " | " | $C_2^=/C_3^=/$ 5-ethylidene-2-norborne = 66/31/3 | " | " | " | " | " |
| CEx. 8 | " | — | " | — | " | " | $C_2^=/C_3^= = 80/20$ | 2.2 | 4.5 | 0.88 | 80 | 0.50 |
| CEx. 9 | " | — | " | " | " | " | $C_2^=/C_3^=/$ 5-ethylidene-2-norborne = 66/31/3 | 2.1 | 0 | 0.87 | 19 | 0.47 |

| | Blend ratio (A)/(B) (wt. %) | Amino group-containing compound (C) | | Polyolefin resin composition | | | | |
|---|---|---|---|---|---|---|---|---|
| | | Species | Weight ratio based on 100 parts by weight of (A)/(B) | IZ (kg.cm/cm) | FM (kg/cm²) | FS (kg/cm²) | Gloss (%) | TMA (%) |
| Ex. 14 | 85/15 | hexamethylene diamine | 0.10 | 17.5 | 22800 | 890 | 75 | 152 |
| Ex. 15 | " | hexamethylene diamine | 0.20 | 16.9 | 22500 | 870 | 76 | 153 |
| Ex. 16 | " | hexamethylene diamine | 0.10 | 18.4 | 23000 | 900 | 70 | 153 |
| Ex. 17 | " | hexamethylene diamine | 0.20 | 15.9 | 22600 | 860 | 71 | 154 |
| CEx. 8 | " | — | 0.20 | 3.2 | 22900 | 910 | 95 | 154 |
| CEx. 9 | " | — | — | 3.5 | 22700 | 880 | 94 | 153 |

Ex. = Example;
CEx. = Comparative Example

Examples 18–19

A cyclic olefin random copolymer (A) and a graft-modified elastic copolymer (B) both shown in Table 5 were dry-blended in a weight ratio of 85/15, and the resultant blend was kneaded with a twin-screw extruder (set at a temperature of 210° C.). Then, 0.2 part by weight, per 100 parts by weight of the (A)/(B) blend, of HMDA was added. And, the resultant blend was again kneaded with the twin screw extruder to give a polyolefin resin composition.

This composition was molded in the same way as in Examples 4 to 8, and physical properties of the resultant molded articles were evaluated. Table 5 shows the physical properties.

The molded articles obtained as above were excellent in impact strength, rigidity, gloss and heat resistance.

The molded articles also exhibited good coatability and coating adhesion.

Comparative Examples 10–11

A cyclic olefin random copolymer (A) and a graft-modified elastic copolymer (B) both shown in Table 5 were dry-blended in a weight ratio of 85/15, and the resultant blend was kneaded twice with a twin screw extruder to give a polyolefin resin composition. This composition was molded in the same way as in Examples 4 to 8, and physical properties of the resultant molded articles were evaluated. Table 5 shows the physical properties.

The molded articles obtained as above had excellent rigidity, gloss and heat resistance, however, had low impact strength.

TABLE 5

| | Cyclic olefin random copolymer (A) | | | | | | Graft-modified elastic copolymer (B) | | | | | |
|---|---|---|---|---|---|---|---|---|---|---|---|---|
| | | Composition (mole %) | | | | | | | | | | Graft amount |
| | Cyclic olefin | 3rd monomer | ethy- lene | 3rd monomer | [η] dl/g | TMA (°C.) | Composition (mole %) | [η] dl/g | Crystal- linity (%) | Density (g/cm) | Tensile modulus (g/cm²) | of maleic anhydride (wt. %) |
| Ex. 18 | CH₃ | butene | 60 | 4 | 0.47 | 155 | $C_2^=/C_3^= = 80/20$ | 2.2 | 4.5 | 0.88 | 80 | 0.50 |
| Ex. 19 | " | — | " | " | " | " | $C_2^=/C_3^=/$ 5-ethylidene-2-norborne = 66/31/3 | 2.1 | 0 | 0.87 | 19 | 0.47 |
| CEx. 10 | " | — | " | " | " | " | $C_2^=/C_3^= = 80/20$ 5-ethylidene-2-norborne = 66/31/3 | 2.2 | 4.5 | 0.88 | 80 | 0.50 |
| CEx. 11 | " | — | " | " | " | " | $C_2^=/C_3^=/$ 5-ethylidene-2-norborne = 66/31/3 | 2.1 | 0 | 0.87 | 19 | 0.47 |

| | Blend ratio (A)/(B) (wt. %) | Amino group-containing compound (C) | | Polyolefin resin composition | | | | |
|---|---|---|---|---|---|---|---|---|
| | | Species | Weight ratio based on 100 parts by weight of (A)/(B) | IZ (kg.cm/cm) | FM (kg/cm²) | FS (kg/cm²) | Gloss (%) | TMA (%) |
| Ex. 18 | 85/15 | hexamethylene diamine | 0.20 | 16.2 | 22800 | 850 | 73 | 154 |
| Ex. 19 | " | hexamethylene diamine | 0.20 | 15.9 | 22400 | 860 | 73 | 154 |
| CEx. 10 | " | — | — | 3.7 | 23200 | 900 | 95 | 153 |

TABLE 5-continued

| CEx. 11 | " | — | — | 3.4 | 23000 | 890 | 96 | 153 |

Ex. = Example;
CEx. = Comparative Example

What is claimed is:
1. A polyolefin resin composition comprising:
(A) a polyolefin resin of a random copolymer of at least one cyclic olefin selected from the group consisting of compounds of the formula (1)

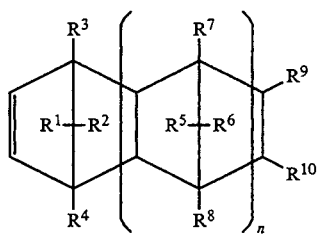

wherein each of $R^1$ to $R^{10}$ independently represents a hydrogen atom, a halogen atom or a monovalent hydrocarbon group, and n represents 0 or a positive integer and compounds of the formula (2)

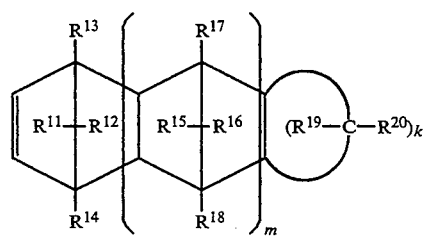

wherein each of $R^{11}$ to $R^{20}$ independently represents a hydrogen atom, a halogen atom or a monovalent hydrocarbon group, m represents 0 or a positive integer, and k represents an integer of not less than 3, ethylene, and, optionally, another olefin,
(B) a graft-modified α-olefin copolymer grafter with unsaturated carboxylic acid or its derivative, and
(C) an amino group-containing compound,
said polyolefin resin composition containing a crosslinked structure between the amino group-containing compound (C) and the graft-modified α-olefin copolymer (B), and containing, based on 100 parts by weight of the polyolefin resin (A) and the graft-modified α-olefin copolymer (B) in total, 60 to 95 parts by weight of the polyolefin resin (A), 5 to 40 parts by weight of the graft-modified α-olefin copolymer (B) and 0.01 to 0.5 parts by weight of the amino group-containing compound (C).

2. A composition according to claim 1, wherein the random copolymer has a crystallinity, determined by X-ray diffractometry, of 0 to 20%.

3. A composition according to claim 1, wherein the random copolymer has an intrinsic viscosity [η], measured in decalin at 135° C., of 0.05to 10 dl/g.

4. A composition according to claim 1, wherein the graft-modified α-olefin random copolymer is a copolymer (B) of graft-modified ethylene and an α-olefin having 3 to 20 carbon atoms or a copolymer of graft-modified propylene and an α-olefin having 4 to 20 carbon atoms.

5. A composition according to claim 1, wherein the unsaturated carboxylic acid as a graft component of the graft-modified α-olefin copolymer (B) is an α,β-unsaturated carboxylic acid.

6. A composition according to claim 1, wherein the derivative of the unsaturated carboxylic acid as a graft component of the graft-modified α-olefin copolymer (B) is an anhydride, halide, amide, imide or ester of the unsaturated carboxylic acid.

7. A composition according to claim 1, wherein the amino group-containing compound (C) has at least two amino groups in the molecule.

8. A composition according to claim 1, wherein the amino group-containing compound (C) is a aliphatic, alicyclic, aliphatic-aromatic, aromatic or spiro ring-form diamine.

9. A composition according to claim 1, which contains, based on 100 parts by weight of the polyolefin resin (A) and the graft-modified α-olefin copolymer (B) in total, 80 to 95 parts by weight of the polyolefin resin (A) and 20 to 5 parts by weight of the graft-modified α-olefin copolymer (B).

10. A composition according to claim 1, which contains, based on 100 parts by weight of the polyolefin resin (A) and the graft-modified α-olefin copolymer (B) in total, 0.2 to 0.5 parts by weight of the amino group-containing compound (C).

11. A composition according to claim 1, which further contains, based on 100 parts by weight of the polyolefin resin (A) and the graft-modified α-olefin copolymer (B) in total, 1 to 100 parts by weight of an inorganic filler.

12. The composition of claim 1, wherein the random copolymer contains from 52 to 90 mole % of ethylene units and 48 to 10 mole % of units of the at least one cycloolefin of formula (1) or formula (2), based on the total of ethylene units and cycloolefin units.

13. The composition of claim 12, wherein the random copolymer comprises units derived from ethylene and the cycloolefin of formula (1).

14. The composition of claim 12, wherein the random copolymer comprises units derived from ethylene and the cyloolefin of formula (2).

15. The composition of claim 1, wherein the random copolymer contains from 55 to 80 mole % of ethylene units and 45 to 20 mole % of units of the at least one cycloolefin of formula (1) or formula (2) based on the total of ethylene units and cycloolefin units.

16. The composition according to claim 1 wherein the random copolymer has a crystallinity determined by x-ray diffractometry of from 0 to 2%.

17. The composition according to claim 1 wherein the graft-modified α-olefin copolymer is a graft-modified ethylene-α-olefin copolymer rubber comprising propylene.

18. The composition according to claim 1 wherein the graft-modified α-olefin copolymer is an ethylene α-olefin copolymer rubber comprising 1-butene.

19. The composition according to claim 1 wherein the graft-modified α-olefin copolymer is an ethylene α-olefin copolymer rubber comprising propylene and 1-butene.

20. The composition according to claim 1 wherein the graft-modified α-olefin copolymer is a propylene-α-olefin copolymer rubber comprising 1-butene.

* * * * *